(12) United States Patent
Weng et al.

(10) Patent No.: US 8,629,670 B2
(45) Date of Patent: Jan. 14, 2014

(54) SWITCHING ADAPTER CONTROL METHOD FOR ADAPTIVE MOBILE POWER SYSTEMS

(75) Inventors: Da Feng Weng, Sunnyvale, CA (US); Qi Cui Wei, Hangzhou (CN)

(73) Assignee: Da Feng Weng, Sunnyvale, CA (US)

( * ) Notice: Subject to any disclaimer, the term of this patent is extended or adjusted under 35 U.S.C. 154(b) by 244 days.

(21) Appl. No.: 13/134,216

(22) Filed: May 31, 2011

(65) Prior Publication Data

US 2011/0298437 A1    Dec. 8, 2011

(30) Foreign Application Priority Data

Jun. 3, 2010 (CN) .......................... 2010 1 0190478

(51) Int. Cl.
*G05F 1/575* (2006.01)

(52) U.S. Cl.
USPC ....................................................... 323/285

(58) Field of Classification Search
USPC ......................................... 323/285, 235, 286
See application file for complete search history.

(56) References Cited

U.S. PATENT DOCUMENTS

| | | | | |
|---|---|---|---|---|
| 4,819,122 A | * | 4/1989 | Gontowski, Jr. | 361/94 |
| 5,912,552 A | * | 6/1999 | Tateishi | 323/285 |
| 6,366,070 B1 | * | 4/2002 | Cooke et al. | 323/284 |
| 8,058,859 B2 | * | 11/2011 | Xu | 323/284 |

* cited by examiner

*Primary Examiner* — Harry Behm

(57) ABSTRACT

A switching adapter control method for adaptive mobile power systems is composed of reference current generator, current mode error compensator, controllable constant turn-off timer, PWM generator and MOSFET driver. The output of the switching adapter can show constant current and voltage characteristics, that means, as the DC bus voltage is over a preset voltage, the adaptor's output characteristic is converted from a constant current source into a constant voltage source with the preset voltage. For low output capacitance case, the present invention has the ability to smoothly reduce the switching frequency of the switching adaptor and reduce the switching losses and meet Energy Star 2.0 requirements under different load conditions. And the output ripple current and voltage can be in the allowed range.

4 Claims, 1 Drawing Sheet

SWITCHING ADAPTER CONTROL METHOD FOR ADAPTIVE MOBILE POWER SYSTEMS

TECHNICAL FIELD

Embodiments of the invention described herein relate generally to the control scheme of the adapter and more particularly to a switching adapter control method for adaptive mobile power systems.

BACKGROUND

Battery lifetime has become an increased strong demand from end-users of mobile computing devices such as notebook computers, netbooks and mobile Internet devices (MID). Statistics data shows that ⅔ of the users are willing to consider battery lifetime as the first or second priority, 50% of the users are willing to pay an extra battery in $30~$40 dollars/1 hour fee. Narrow $V_{DC}$ (NVDC) of the power transmission structure, proposed by Intel, is one of many proposals to extend battery lifetime in mobile systems. This technology has evolved into two generations, the first generation NVDC called NVDC-I and the second-generation NVDC adaptive mobile power system (AMPS).

In Adaptive Mobile Power Systems (AMPS), the switching adapter is a key part. It is combined with the battery system of the mobile computing device to constitute a so-called Adaptive Mobile Power System (AMPS). The ideal output of the switching power adapter for Adaptive Mobile Power System (AMPS) is a constant current source characteristic. Due to its characteristics of current source, Adaptive Mobile Power System (AMPS) DC bus voltage is basically determined with the battery voltage. Due to its current source characteristics, the output of the switching adapter can directly charge rechargeable battery systems of the Adaptive Mobile Power System (AMPS). When the system load requires current, the output of the adapters can automatically assign the appropriate current to the system load, and reduce the charge current to the battery systems accordingly. In this system, when the system required load current is bigger than the output current of the switching adapter, the output of this switching adapter and the output of the battery system can be paralleled together and offer enough current for the system load.

Because Adaptive Mobile Power System (AMPS) DC bus voltage is basically determined with the battery voltage, this constant output current of the switching adapter will increase the DC bus voltage and damage the battery and all power converters hanged on the DC bus as the battery is nearly full and the system load does not need current. To avoid this issue, the adapter must have a constant current and voltage function, that means, as the DC bus voltage is over a preset voltage, the adaptor's output characteristic is converted from a constant current source into a constant voltage source with the preset voltage. This switching adapter also needs to meet Energy Star 2.0 requirements under different load conditions.

In existed switching adapters, its output is a constant voltage source. Therefore, its output can be with a relatively large output capacitor. Due to this relatively large output capacitor, with existing control scheme, the switch adapters can meet Energy Star 2.0 requirements under different load conditions. For Adaptive Mobile Power System (AMPS) application, the switching adapter must have a constant current and voltage function, that means, as the DC bus voltage is over a preset voltage, the adaptor's output characteristic is converted from a constant current source into a constant voltage source with the preset voltage, and the existed switching adapter control method is not suitable for the switching adaptor used for Adaptive Mobile Power System (AMPS).

SUMMARY OF THE INVENTION

For Adaptive Mobile Power System (AMPS), the switching adapter must have a constant current and voltage function, that means, as the DC bus voltage is over a preset voltage, the adaptor's output characteristic is converted from a constant current source into a constant voltage source with the preset voltage. The existing switching adapter control scheme is not suitable for Adaptive Mobile Power System (AMPS) due to only constant voltage function. The present invention proposes a control scheme of the switching adapter for Adaptive Mobile Power System (AMPS).

The present invention proposal can control the switching adaptor's output with constant current and voltage function, that means, as the DC bus voltage is over a preset voltage, the adaptor's output characteristic is converted from a constant current source into a constant voltage source with the preset voltage. The switching adapter control scheme of the present invention not only can control the switching adaptor output with the constant current and voltage characteristics but also meet Energy Star 2.0 requirements under different load conditions.

The present invention is composed of reference current generator, current mode error compensator, controllable constant turn-off timer, PWM generator and MOSFET driver. According to the detected output voltage Vo and preset the output voltage Vref, the reference current generator generates the corresponding reference current. The current mode error compensator is used to amplify and compensate the error between the detected output current and the reference current from the reference current generator and to output a control signal for the PWM generator. The PWM generator output PWM turn-on control signal based on the output of the current mode error compensator. Based on the output of the reference current generator, the controllable constant turn-off timer outputs the related turn-off time to make the PWM generator output the turn-off control signal and make the power switch turn off for the turn-off time. Based on the output of the PWM generator, the MOSFET driver is used to drive the power switch, MOSFET turn-on or off.

The reference current generator has several calculating function blocks to output reference current, based on the feed backed output voltage. The current mode error compensator has both average or quasi average current mode and peak current mode function blocks. Based on the output of the reference current generator, the current mode error compensator makes related average or quasi average and peak current mode control. The controllable constant turn-off timer can be a regular timer with preset nonlinear function. Based on the output of the reference current generator, the controllable constant turn-off timer outputs a constant off time or a variable off time. Based on the output of the current mode error compensator and the controllable constant turn-off timer, the PWM generator generates PWM control signal. The MOSFET driver is used to drive the power MOSFET turn-on or off based on the output of PWM generator.

For the switching adapter operation, when the output power of the switching adapter is decreased. It means to reduce the output average current. At this case, this switching adaptor's efficiency will decrease due to the output power decrease. If the switching frequency isn't reduced, it is difficult to meet Energy Star 2.0 requirements under different load conditions.

For the general constant output voltage of switching power supply, in order to meet Energy Star 2.0 requirements under different load conditions, the skip mode control can be used as shown in FIG. 1. In order to reduce the average switching frequency converter, in the skip mode control, the converter's average switching frequency is low due to this skip cycle modulation, it reduces switching losses and meet the requirements corresponding Energy Star 2.0 for the different load conditions. FIG. 1 shows, the lower the frequency modulation frequency, the lower the corresponding switching loss.

For the switching adapter with constant current and voltage characteristics, that means, as the DC bus voltage is over a preset voltage, the adaptor's output characteristic is converted from a constant current source into a constant voltage source with the preset voltage, due to the output constant current characteristics, it limits the output capacitor value. Due to the low output capacitance and low-frequency modulation, the output current and voltage will have a considerable ripple. Skip mode control is clearly not suitable for applications where low output capacitance.

In the invention, the preset peak switch's current of the switching adaptor is used to control the switching frequency, that is, to control the turn-off time. In this way, the preset peak switch's current has linear or other relation with the switching frequency, that is, with the preset peak switch's current decrease, the related switching frequency is decreased too. It will reduce the switching loss and meet Energy Star 2.0 requirements under different load conditions. Due to without low frequency modulation, even lower output capacitor, the output ripple on the current and voltage can be in allowed range.

As shown in FIG. 2, the invention control scheme used for the switching adapter of Adaptive Mobile Power System (AMPS) is composed of the reference current generator, the current mode error compensator, the controllable constant turn-off timer, the PWM generator and the MOSFET driver; According to the detected output voltage Vo and preset the output voltage Vref, the reference current generator generates the corresponding reference current. The current mode error compensator is used to amplify and compensate the error between the detected output current and the reference current from the reference current generator and to output the control signal for the PWM generator. The PWM generator outputs PWM turn-on control signal based on the output of the current mode error compensator. Based on the output of the reference current generator, the controllable constant turn-off timer outputs the related turn-off time to make the PWM generator output the turn-off control signal and make the power switch turn off for the turn-off time. Based on the output of the PWM generator, the MOSFET driver is used to drive the power switch, MOSFET turn-on or off.

Advantage of the present invention has the ability to smoothly reduce the switching frequency of the switching adaptor and reduce the switching losses and meet Energy Star 2.0 requirements under different load conditions.

Advantages of the present invention is smoothly to reduce switching frequency of the switching adaptor and low output capacitance can be used and the output ripple current and voltage can be in the allowed range.

Advantages of the present invention can use low-value output capacitor at the output switching adapter. The output of the switching adapter can show constant current and voltage characteristics, that means, as the DC bus voltage is over a preset voltage, the adaptor's output characteristic is converted from a constant current source into a constant voltage source with the preset voltage.

DETAILED DESCRIPTION OF THE INVENTION

Figure 1:
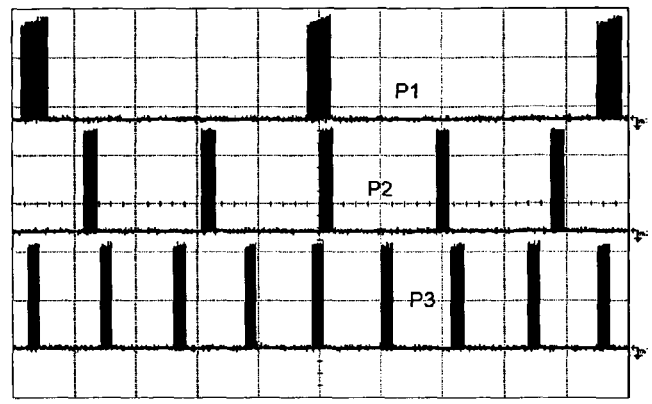
FIG. 1 illustrates the output waveform of the existed skip cycle mode control used by existed switching adapters, the output power level is corresponding to three levels, that P3>P2>P1.
Figure 2:
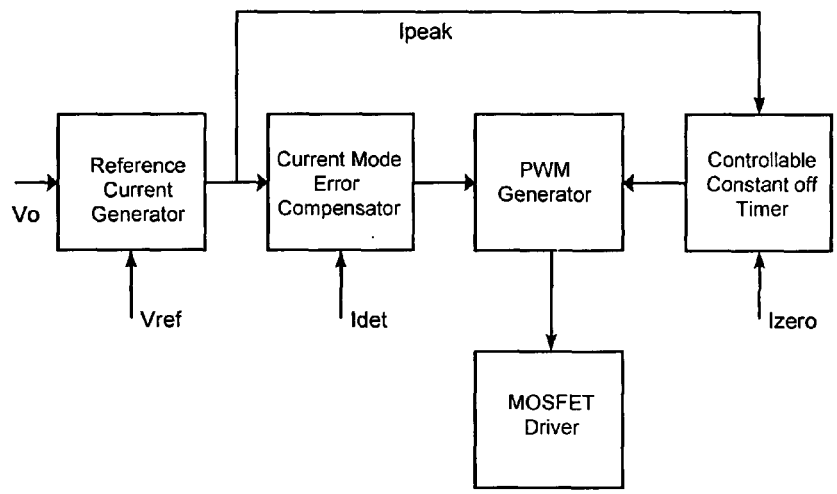
FIG. 2 illustrates a the proposal invention diagram of the switching adapter control scheme for Adaptive Mobile Power System (AMPS).
Figure 3:
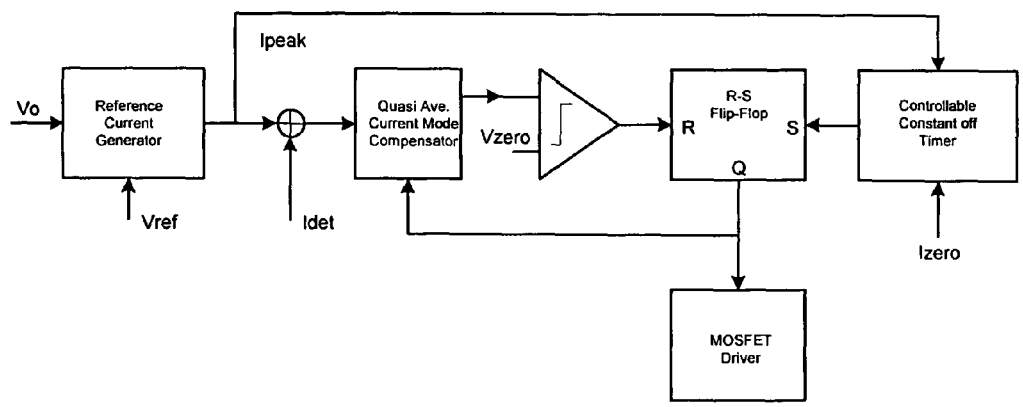
FIG. 3 illustrates the invention control method of switching adaptive for mobile power systems according to preferred embodiment of the instant invention.

As shown in FIG. 3, the present invention's control scheme used for the switching adapter of Adaptive Mobile Power System (AMPS) is composed of the reference current generator, the quasi average current mode error compensator, the controllable constant turn-off timer, the PWM generator and the MOSFET driver; According to the detected output voltage Vo and preset the output voltage Vref, the reference current generator generates the corresponding reference current. The quasi average current mode error compensator is to amplify and compensate the error between the detected output current Idet and the reference current from the reference current generator to output the compensated error control signal for the PWM generator. Based on the output Ipeak of the reference current generator, the controllable constant turn-off timer outputs the related turn-off time to make the PWM generator output the turn-off control signal and make the power switch turn off for the turn-off time. The PWM generator outputs PWM turn-on control signal based on the output of the quasi average current mode error compensator through its comparator. Based on the output of the PWM generator, the MOSFET driver is used to drive the power switch, MOSFET turn-on or off.

The quasi average current mode error compensator is synchronize with the PWM generator to implement the quasi average current mode control and make the output average current or peak current following the reference current from the reference current generator.

The turn-off time of the controllable constant turn-off timer is controlled with the output Ipeak of the reference current generator. The lower Ipeak value, the longer turn-off time. Its turn-off time is started with Izero triggering signal. Izero signal can come from the PWM generator, that is, MOSFET turn-off instant or inductor current drop to zero instant.

The PWM generator bases on the output of the quasi average current mode error compensator to trigger the R-S flip-flop turn-on through its comparator. The controllable constant turn-off timer will trigger the R-S flip-flop turn-off through S pin of the R-S flip-flop.

In the control method of the invention, it is the controllable constant turn-off timer that triggers a new switching cycle, and its turn-off time is vary with the output Ipeak from the reference current generator, that is, with Ipeak decrease, the related switching frequency is decreased too. It will reduce the switching loss and meet Energy Star 2.0 requirements under different load conditions. Due to without low frequency modulation, even lower output capacitor, the output ripple on the current and voltage can be in allowed range.

What is claimed is:

1. A switching adapter control apparatus for adaptive mobile power systems comprising a reference current generator, a current mode error compensator, a controllable constant turn-off timer, a PWM generator and a driver; wherein the reference current generator generates a corresponding reference current, according to the detected output voltage Vo and the preset output voltage Vref;

the current mode error compensator is used to amplify and compensate the error between the detected output current and the corresponding reference current to output the control signal for the PWM generator;

the PWM generator outputs PWM turn-on signal based on the control signal;

the PWM generator outputs PWM turn-off signal based on the controllable constant turn-off timer;

the controllable constant turn-off timer is controlled with the corresponding reference current and Izero triggering signal; the Izero triggering signal can come from the PWM generator, that is, PWM turn-off instant or inductor current drop to zero instant;

the driver receives the PWM control signal and switches a power switch on and off.

2. The switching adapter control apparatus for adaptive mobile power systems claim 1, wherein the reference current generator has several calculating function blocks to output the reference current, based on the detected output voltage.

3. The switching adapter control apparatus for adaptive mobile power systems claim 1, wherein the current mode error compensator has average or peak current mode function blocks.

4. The switching adapter control apparatus for adaptive mobile power systems claim 1, wherein the controllable constant turn-off timer is controlled with Ipeak preset nonlinear function.

* * * * *